United States Patent
Hayashi et al.

(10) Patent No.: US 10,584,198 B2
(45) Date of Patent: Mar. 10, 2020

(54) POLYESTERS, POLYURETHANES, ELASTOMERS, PROCESSES FOR MANUFACTURING POLYESTERS AND PROCESSES FOR MANUFACTURING POLYURETHANES

(71) Applicant: Mitsubishi Gas Chemical Company, Inc., Chiyoda-ku (JP)

(72) Inventors: Takeo Hayashi, Niigata (JP); Hideyuki Sato, Niigata (JP)

(73) Assignee: Mitsubishi Gas Chemical Company, Inc., Chiyoda-ku (JP)

( * ) Notice: Subject to any disclaimer, the term of this patent is extended or adjusted under 35 U.S.C. 154(b) by 0 days.

(21) Appl. No.: 15/321,577

(22) PCT Filed: Jul. 2, 2015

(86) PCT No.: PCT/JP2015/069104
§ 371 (c)(1),
(2) Date: Dec. 22, 2016

(87) PCT Pub. No.: WO2016/002874
PCT Pub. Date: Jan. 7, 2016

(65) Prior Publication Data
US 2017/0210842 A1   Jul. 27, 2017

(30) Foreign Application Priority Data
Jul. 2, 2014   (JP) .................. 2014-136692

(51) Int. Cl.
C08G 18/42   (2006.01)
C08G 63/672   (2006.01)
C08G 18/10   (2006.01)
C08G 18/66   (2006.01)
C08G 18/76   (2006.01)

(52) U.S. Cl.
CPC ........... *C08G 18/425* (2013.01); *C08G 18/10* (2013.01); *C08G 18/664* (2013.01); *C08G 18/7671* (2013.01); *C08G 63/672* (2013.01)

(58) Field of Classification Search
CPC .... C08G 18/425; C08G 18/664; C08G 18/10; C08G 18/7671; C08G 63/672
See application file for complete search history.

(56) References Cited

U.S. PATENT DOCUMENTS

| | | | |
|---|---|---|---|
| 3,097,192 A * | 7/1963 | Schilit | C08G 18/10 264/DIG. 77 |
| 3,287,419 A | 11/1966 | Duke, Jr. | |
| 2002/0028875 A1* | 3/2002 | Anderle | A61K 8/87 524/591 |
| 2015/0329454 A1 | 11/2015 | Okamoto et al. | |

FOREIGN PATENT DOCUMENTS

| | | |
|---|---|---|
| JP | 52-132094 A | 11/1977 |
| JP | 60-26018 A | 2/1985 |
| JP | 60-229918 A | 11/1985 |
| JP | 5-320302 A | 12/1993 |
| JP | 9-235359 A | 9/1997 |
| JP | 9-235365 A | 9/1997 |
| JP | 10-204376 A | 8/1998 |
| JP | 3589779 B2 | 11/2004 |
| WO | WO 2014/104341 A1 | 7/2014 |

OTHER PUBLICATIONS

Ionescu, M.; Chemistry and Technology of Polyols for Polyurethanes, 2005, p. 1-12 and 263-294.*
International Search Report dated Sep. 29, 2015 in PCT/JP2015/069104.
International Preliminary Report on Patentability and Written Opinion dated Jan. 12, 2017 in PCT/JP2015/069104 (with English language translation).
Antonio Bello, et al., "Thermotropic Liquid Crystal Polyesters Derived From 4,4'-Biphenyldicarboxylic Acid and Oxyalkylene Spacers" Macromol. Symp., vol. 84, 1994, pp. 297-306.

* cited by examiner

*Primary Examiner* — Robert S Jones
(74) *Attorney, Agent, or Firm* — Oblon, McClelland, Maier & Neustadt, L.L.P.

(57) ABSTRACT

Provided is a starting material for polyurethanes having excellent hydrolysis resistance and heat resistance, especially heat aging resistance. Further provided is polyurethanes and elastomers obtained by using the polyesters, as well as processes for manufacturing the polyesters and processes for manufacturing the polyurethanes. The polyester contains one or more types of repeating unit represented by formula [I] below, wherein 70% or more of a terminal group thereof is hydroxyl group, or 70% or more of a terminal group thereof is carboxyl groups; wherein $R^1$, $R^2$, $R^3$ and $R^4$ each independently represent an aliphatic hydrocarbon group containing 1 to 6 carbon atoms, and A represents a divalent group selected from aliphatic groups, alicyclic groups, and aromatic groups.

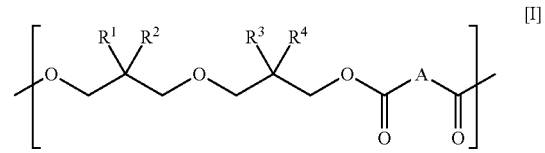

23 Claims, No Drawings

POLYESTERS, POLYURETHANES, ELASTOMERS, PROCESSES FOR MANUFACTURING POLYESTERS AND PROCESSES FOR MANUFACTURING POLYURETHANES

TECHNICAL FIELD

The present invention relates to novel polyesters, more specifically it relates to novel polyesters that can be used as starting materials for forming polyurethanes, polyester elastomers, polyamide elastomers and the like having excellent hydrolysis resistance and heat resistance (especially heat aging resistance); as component materials of paints, adhesives, pressure-sensitive adhesives, inks, covering materials, encapsulants and the like; and as polymer modifiers, polymer plasticizers and the like.

BACKGROUND ART

Conventionally, polyesters containing hydroxyl groups at the ends of the molecules have been used in the fields of paints, adhesives, polyurethanes and the like.

Known such polyesters include polyesters obtained from a polyalcohol such as ethylene glycol, diethylene glycol, propylene glycol, neopentyl glycol, 1,4-butanediol, 3-methyl-1,5-pentanediol, 1,6-hexanediol, trimethylolpropane or glycerin and a polybasic acid or an anhydrate thereof or an ester derivative thereof.

Among these polyesters, polyesters containing hydroxyl groups at the ends of the molecules obtained by an esterification reaction between an aliphatic dicarboxylic acid such as adipic acid and a dihydric or polyhydric alcohol are used in a wide range of applications such as elastomers, paints, adhesives, coatings and foams because they can be converted into polyurethanes by a reaction with an isocyanate compound having a functionality of 2 or more.

Similarly, polyesters containing carboxyl groups at the ends of the molecules can be converted into polyester polyamides having excellent heat resistance by a reaction with an isocyanate compound having a functionality of 2 or more.

In addition, polyesters obtained by an esterification reaction between a dihydric or polyhydric alcohol and a combination of polybasic acids, i.e., a combination of an aromatic dicarboxylic acid such as phthalic anhydride, isophthalic acid or terephthalic acid and an aliphatic dicarboxylic acid such as adipic acid are widely used in the fields of polyurethanes, paints, adhesives and the like. However, polyurethanes and the like obtained by using polyesters as polyol components have the disadvantage that they are susceptible to hydrolysis.

On the other hand, polyurethanes obtained by using polyethers are superior to polyurethanes obtained by using polyesters in hydrolysis resistance, but inferior in weather resistance as well as mechanical properties, oil resistance, and solvent resistance so that they are limited in their use. Further, polyurethanes obtained by using polycarbonates having excellent hydrolysis resistance improve the disadvantage described above, but the polyurethanes are insufficient in cold resistance and very expensive so that they are limited in their industrial use.

Therefore, there have been demands for polyesters that can provide polyurethanes retaining excellent properties such as flexibility, heat resistance (especially heat aging resistance), and mechanical properties and particularly having excellent hydrolysis resistance.

Known conventional polyester-based polyurethanes having relatively good hydrolysis resistance include polyurethanes obtained by using neopentyl glycol, or polyurethanes obtained by using 2-butyl-2-ethyl-1,3-propanediol (patent document 1), or polyurethanes obtained by using 2,4-dialkyl-1,5-pentanediol (patent document 2) or the like.

Alternatively, attempts have been made to improve hydrolysis resistance by using polyesters containing a branched-chain dicarboxylic acid unit having one methyl group side chain as starting materials for polyurethanes. For example, polyurethanes obtained by using polyesters derived from a dicarboxylic acid containing 3-methylpentanedioic acid (patent document 3) or 2-methyloctanedioic acid (patent document 4) as starting materials have been proposed.

These polyurethanes were improved in hydrolysis resistance as compared with the previous polyurethanes, but still insufficient.

On the other hand, patent document 5 describes polyesters for use as starting materials of polyurethanes. Specifically, Example 4 of patent document 5 describes that a polyester obtained by reacting 3,3'-oxybis(2-ethyl-2-butyl-1-propanol) and terephthalic acid in an equimolar ratio shows stability against thermal degradation. Further, it describes that such a polyester is useful as an extenders for polyurethanes.

In addition, patent document 6 and patent document 7 disclose processes for continuously preparing polyester resins containing an aromatic dicarboxylic acid and an aliphatic diol as main components.

REFERENCES

Patent Documents

Patent document 1: JPA1985-229918
Patent document 2: Japanese Patent No. 3589779
Patent document 3: JPA1985-26018
Patent document 4: JPA1993-320302
Patent document 5: U.S. Pat. No. 3,287,419
Patent document 6: JPA1997-235365
Patent document 7: JPA1997-235359

SUMMARY OF THE INVENTION

Problems to be Solved by the Invention

As described above, patent document 5 describes a polyester obtained by reacting 3,3'-oxybis(2-ethyl-2-butyl-1-propanol) and terephthalic acid in an equimolar ratio. However, polyesters obtained by reacting a diol component and a dicarboxylic acid component in equimolar quantities as described in patent document 5 generally contain 50% of terminal hydroxyl groups. Further, patent document 5 neither describes nor suggests means for achieving 70% or more of terminal hydroxyl groups.

On the other hand, the polyesters described in patent documents 6 and 7 have different structures from those of the polyesters disclosed herein, and nothing is described about physical properties of polyurethanes prepared by using the resulting polyesters as starting materials.

The present invention aims to provide polyesters that can be used as starting materials for polyurethanes having excellent hydrolysis resistance and heat resistance, especially heat aging resistance. It also aims to provide polyurethanes and elastomers obtained by using the polyesters, as well as processes for manufacturing the polyesters and processes for manufacturing the polyurethanes.

Solution to Problem

As a result of our careful studies to achieve the objects described above, we found that polyurethanes (thermoplastic polyurethanes) having excellent hydrolysis resistance and heat resistance, especially heat aging resistance can be obtained by using polyesters containing a specific structural unit, and finally attained the present invention.

Thus, the present invention provides the following:

<1> A polyester comprising one or more types of repeating unit represented by formula [I] below, wherein 70% or more of a terminal group thereof is hydroxyl group, or 70% or more of a terminal group thereof is carboxyl group;

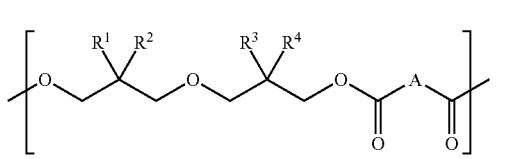

wherein $R^1$, $R^2$, $R^3$ and $R^4$ each independently represent an aliphatic hydrocarbon group containing 1 to 6 carbon atoms, and A represents a divalent group selected from aliphatic groups, alicyclic groups, and aromatic groups.

<2> The polyester according to <1>, wherein 90% or more of a terminal group thereof is hydroxyl group, or 90% or more of a terminal group thereof is carboxyl group.

<3> The polyester according to <1> or <2>, wherein the repeating unit represented by formula [I] is contained at a ratio of 20 mol % or more among all repeating units.

<4> The polyester according to any one of <1> to <3>, wherein, in the repeating unit represented by formula [I], a combination of $R^1$ and $R^2$ and a combination of $R^3$ and $R^4$ are different from each other.

<5> The polyester according to any one of <1> to <4>, having a number average molecular weight of 400 to 10000.

<6> The polyester according to any one of <1> to <5>, having a glass transition temperature of 30° C. or less as measured by differential scanning calorimetry.

<7> The polyester according to any one of <1> to <6>, wherein the repeating unit represented by formula [I] is contained at a ratio of 50 mol % or more among all repeating units.

<8> The polyester according to any one of <1> to <7>, wherein the repeating unit of formula [I], wherein A is a divalent aliphatic group, is contained at a ratio of 10 mol % or more among all repeating units represented by formula [I], and the repeating units represented by formula [I], wherein A represents a divalent aromatic group, is contained at a ratio of less than 90 mol % among all repeating units represented by formula [I].

<9> The polyester according to any one of <1> to <8>, wherein the repeating unit of formula [I], wherein A is a divalent aliphatic group, is contained at a ratio of 90 mol % or more among all repeating units represented by formula [I].

<10> The polyester according to <9>, wherein A in formula [I] is each independently selected from tetramethylene group, octamethylene group and decamethylene group.

<11> The polyester according to any one of <1> to <10>, wherein 90 mol % or more of a terminal group thereof is hydroxyl group.

<12> The polyester according to any one of <1> to <11>, wherein $R^1$ and $R^2$ represent methyl group in formula [I].

<13> The polyester according to <12>, wherein $R^3$ and $R^4$ represent methyl group in formula [I].

<14> The polyester according to <12>, wherein at least one of $R^3$ and $R^4$ represents a group other than methyl group in formula [I].

<15> A polyurethane obtained by using the polyester according to any one of <1> to <14> as a starting material.

<16> An elastomer comprising the polyurethane according to <15>.

<17> A process for manufacturing a polyester, comprising reacting a diol component containing one or more types of diol represented by formula [III] below with a dicarboxylic acid in a molar ratio of 1.2 to 3.0:1;

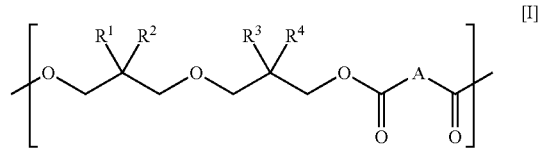

wherein $R^1$, $R^2$, $R^3$ and $R^4$ each independently represent an aliphatic hydrocarbon group containing 1 to 6 carbon atoms.

<18> A process for manufacturing a polyurethane, comprising reacting the polyester according to any one of <1> to <14> with a polyisocyanate.

<19> The process for manufacturing a polyurethane according to <18>, comprising reacting the polyester with a polyisocyanate to give a prepolymer, and reacting the prepolymer with a chain extender.

<20> A polyurethane comprising a repeating unit represented by formula [I] below;

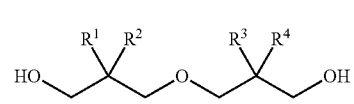

wherein $R^1$, $R^2$, $R^3$ and $R^4$ each independently represent an aliphatic hydrocarbon group containing 1 to 6 carbon atoms, and A represents a divalent group selected from aliphatic groups, alicyclic groups, and aromatic groups.

<21> The polyurethane as defined in <20>, comprising a repeating unit represented by formula [X] below:

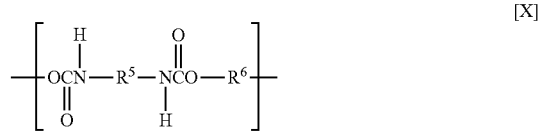

wherein $R^5$ represents a divalent hydrocarbon group, and $R^6$ contains a repeating unit represented by formula [I].

<22> The polyurethane as defined in <20>, further comprising a repeating unit represented by formula [XX] below:

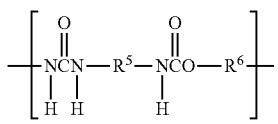

wherein $R^7$ represents a divalent hydrocarbon group, and $R^8$ contains a repeating unit represented by formula [I].

Advantages of the Invention

The present invention has great industrial significance in that polyurethanes having excellent hydrolysis resistance and heat resistance (especially heat aging resistance) can be obtained by using the polyesters of the present invention.

THE MOST PREFERRED EMBODIMENTS OF THE INVENTION

The present invention will be explained in detail below.

As used herein, each numerical range expressed by two values on both sides of "to" is used to mean the range including the values indicated before and after "to" as lower and upper limits. As used herein, "Me" means methyl group.

The polyesters of the present invention are characterized in that they comprise one or more types of repeating unit represented by formula [I] above, whereby polyurethanes having excellent hydrolysis resistance and heat resistance (especially heat aging resistance) can be obtained.

The mechanism by which the weather resistance and heat resistance (especially heat aging resistance) of the polyurethanes could be improved may be explained by the fact that the repeating unit represented by formula [I] not only improves weather resistance by the stability of two quaternary carbon atoms present in the diol-derived moiety but also improves hydrolysis resistance by the hydrophobicity that the quaternary carbon atoms exert.

The polyesters of the present invention preferably comprise 20 mol % or more of one or more types of repeating unit represented by formula [I] above among all repeating units to obtain polyurethanes having excellent hydrolysis resistance and heat resistance (especially heat aging resistance), more preferably 50 mol % or more of one or more types of repeating unit represented by formula [I] among all repeating units, or they may comprise even 80 mol % or more of one or more types of repeating unit represented by formula [I] among all repeating units, especially they may comprise 90 mol % or more of one or more types of repeating unit represented by formula [I] among all repeating units. Further, the polyesters comprising one or more types of repeating unit represented by formula [I] and other repeating units can be appropriately adjusted to achieve various performances based on the stability of the quaternary carbon atoms originally contained in the repeating unit represented by formula [I] as well as to achieve desired performances by incorporating the other repeating units.

In formula [I] above, $R^1$, $R^2$, $R^3$ and $R^4$ each independently represent an aliphatic hydrocarbon group containing 1 to 6 carbon atoms, e.g., methyl group, ethyl group, n-propyl group, 1-methylethyl group (isopropyl group), n-butyl group, 1-methylpropyl group, 2-methylpropyl group, 1,1-dimethylethyl group (tert-butyl group), n-pentyl group, 1-methylbutyl group, 2-methylbutyl group, 3-methylbutyl group, 1-ethylpropyl group, 1,1-dimethylpropyl group, 1,2-dimethylpropyl group, 2,2-dimethylpropyl group (neopentyl group), n-hexyl group, 1-methylpentyl group, 2-methylpentyl group, 3-methylpentyl group, 4-methylpentyl group, 1,1-dimethylbutyl group, 1,2-dimethylbutyl group, 1,3-dimethylbutyl group, 2,2-dimethylbutyl group, 2,3-dimethylbutyl group, 3,3-dimethylbutyl group, 1-ethylbutyl group, 2-ethylbutyl group, 1,1,2-trimethylpropyl group, 1,2,2-trimethylpropyl group, 1-ethyl-1-methylpropyl group, and 1-ethyl-2-methylpropyl group.

Among them, preferred are methyl group, ethyl group, n-propyl group, 1-methylethyl group (isopropyl group), n-butyl group, 1-methylpropyl group, 2-methylpropyl group, n-pentyl group, 1-methylbutyl group, 2-methylbutyl group, 3-methylbutyl group, 1-ethylpropyl group and n-hexyl group, more preferably methyl group, ethyl group, n-propyl group, n-butyl group, n-pentyl group and n-hexyl group.

In the repeating unit, $R^1$ and $R^2$ more preferably represent methyl group, and $R^3$ and $R^4$ preferably each independently represent a group selected from methyl group, ethyl group, n-propyl group, n-butyl group, n-pentyl group, or n-hexyl group. Further preferably in the repeating unit, $R^1$ and $R^2$ represent methyl group, $R^3$ is methyl group or ethyl group and $R^4$ is a group selected from methyl group, ethyl group, n-propyl group and n-butyl group.

In the repeating unit represented by formula [I], the combination of $R^1$ and $R^2$ and the combination of $R^3$ and $R^4$ may be different from each other.

The combinations are preferably different because polyurethanes obtained by using such polyesters tend to have more improved weather resistance and heat aging resistance.

The present invention includes, for example, embodiments of formula [I] wherein $R^1$ and $R^2$ represent methyl group and at least one of $R^3$ and $R^4$ represents a group other than methyl group.

Particularly in the present invention, preferred examples include the following embodiments.

In a first embodiment of formula [I] of the present invention, all of $R^1$ to $R^4$ represent methyl group.

In a second embodiment of formula [I] of the present invention, $R^1$ and $R^2$ represent methyl group, $R^3$ represents ethyl group, and $R^4$ represents n-butyl group.

In a third embodiment of formula [I] of the present invention, $R^1$ and $R^2$ represent methyl group, and $R^3$ and $R^4$ represent ethyl group.

In a fourth embodiment of formula [I] of the present invention, all of $R^1$ to $R^3$ represent methyl group, and $R^4$ represents n-propyl group.

The method for manufacturing the polyesters of the present invention is not specifically limited, but they can be prepared by using a diol compound represented by formula [III] below as a starting material, for example. More specifically, a polyester comprising a repeating unit represented by formula [I] can be obtained by reacting a diol represented by formula [III] or the like with a dicarboxylic acid component to form an ester.

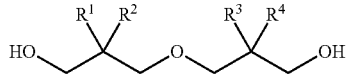

wherein $R^1$, $R^2$, $R^3$ and $R^4$ each independently represent an aliphatic hydrocarbon group containing 1 to 6 carbon atoms. $R^1$, $R^2$, $R^3$ and $R^4$ have the same meanings as defined for $R^1$, $R^2$, $R^3$ and $R^4$ in formula [I], and also cover the same preferred ranges.

The method for manufacturing the diol compound is not specifically limited, but it can be prepared by, for example, reduction by hydrogenation of an acetal of formula [III] below:

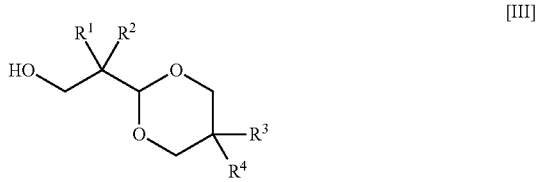

wherein $R^1$, $R^2$, $R^3$ and $R^4$ each independently represent an aliphatic hydrocarbon group containing 1 to 6 carbon atoms. $R^1$, $R^2$, $R^3$ and $R^4$ have the same meanings as defined for $R^1$, $R^2$, $R^3$ and $R^4$ in formula [I], and also cover the same preferred ranges.

The acetal of formula [III] can be obtained by acetalization of 2,2-disubstituted-3-hydroxypropanal and 2,2-disubstituted-1,3-propanediol as shown by formula [IV] below:

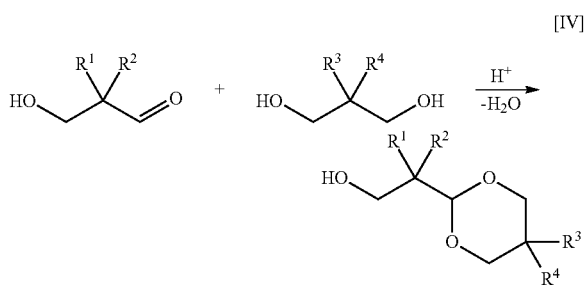

wherein $R^1$, $R^2$, $R^3$ and $R^4$ each independently represent an aliphatic hydrocarbon group containing 1 to 6 carbon atoms.

The polyesters of the present invention can be obtained by esterifying the diol of formula [II] above with a dicarboxylic acid component after a diol component other than the diol of formula [II] above is added as appropriate to give a polyester comprising a repeating unit of formula [I].

The nature of the diol component other than the diol of formula [II] above used in the polyesters of the present invention is not specifically limited, and any diol components that can be used as starting materials for polyesters can be used depending on required properties.

Examples of diol components other than the diol of formula [II] above include

Examples of starting diols of repeating units other than the repeating unit of formula [II] above include aliphatic diols such as ethylene glycol, 1,2-propylene glycol, 1,3-propanediol, 1,3-butanediol, 2-methyl-1,3-propanediol, 1,3-pentanediol, 2,4-pentanediol, 2-methyl-1,3-butanediol, neopentyl glycol, 1,3-hexanediol, 3-methyl-1,3-butanediol, 1,5-pentanediol, 2-methyl-1,5-pentanediol, 3-methyl-1,5-pentanediol, 1,5-hexanediol, 2-ethyl-1,5-pentanediol, 2-propyl-1,5-pentanediol, 2,2-diethyl-1,3-propanediol, 2-methyl-2-propyl-1,3-propanediol, 2-butyl-2-ethyl-1,3-propanediol, 2-methyl-1,2-propanediol, 1,4-butanediol, 1,6-hexanediol, 2,5-hexanediol, 1,9-nonanediol, 2-methyl-1,8-octanediol, diethylene glycol, triethylene glycol, m-xylylene glycol, p-xylylene glycol, polyethylene glycol, polypropylene glycol and polybutylene glycol; alicyclic diols such as 1,3-cyclohexanediol, 1,4-cyclohexanediol, 1,3-bis(hydroxymethyl)cyclohexane, 1,4-bis(hydroxymethyl)cyclohexane, 1,3-cyclohexane dimethanol, 1,4-cyclohexane dimethanol, 1,2-decahydronaphthalene dimethanol, 1,3-decahydronaphthalene dimethanol, 1,4-decahydronaphthalene dimethanol, 1,5-decahydronaphthalene dimethanol, 1,6-decahydronaphthalene dimethanol, 2,7-decahydronaphthalene dimethanol, tetralin dimethanol, norbornane dimethanol, tricyclodecane dimethanol, 5-methylol-5-ethyl-2-(1,1-dimethyl-2-hydroxyethyl)-1,3-dioxane, pentacyclododecane dimethanol and 3,9-bis(1,1-dimethyl-2-hydroxyethyl)-2,4,8,10-tetraoxaspiro[5.5]undecane; alkylene oxide adducts of bisphenols such as 4,4'-(1-methylethylidene)bisphenol, methylenebisphenol (bisphenol F), 4,4'-cyclohexylidenebisphenol (bisphenol Z) and 4,4'-sulfonylbisphenol (bisphenol S); alkylene oxide adducts of aromatic dihydroxy compounds such as hydroquinone, resorcin, 4,4'-dihydroxybiphenyl, 4,4'-dihydroxydiphenyl ether and 4,4'-dihydroxydiphenyl benzophenone; and the like.

In formula [I] above, A is a residue of the dicarboxylic acid component, and represents a divalent group selected from aliphatic groups, alicyclic groups, and aromatic groups, wherein 60 mol % or more (preferably 80 mol % or more, more preferably 90 mol % or more) of A is preferably an aliphatic group or alicyclic group, more preferably 60 mol % or more (preferably 80 mol % or more, more preferably 90 mol % or more) of A is an aliphatic group. The aliphatic group may be a straight-chain aliphatic group or a branched-chain aliphatic group, but preferably a straight-chain aliphatic group. An aliphatic group is preferably selected, because the Tg of the resulting polyester can be lower. Preferably, A contains 3 to 10 carbon atoms.

The nature of the group A is not specifically limited, and any groups that can be used for polyesters can be used depending on required properties. Examples of A groups include aliphatic groups such as methylene group, dimethylene group, trimethylene group, tetramethylene group, pentamethylene group, hexamethylene group, 2-methyltrimethylene group, heptamethylene group, 1-methylhexamethylene group, octamethylene group, nonamethylene group, decamethylene group, dimethyloctamethylene group, and undecamethylene group; alicyclic groups such as 1,3-cyclohexylene group, 1,4-cyclohexylene group, 2,6-decahydronaphthylene group, bicyclo[2.2.1]heptylene group, tricyclodecylene group, and pentacyclododecylene group; aromatic groups such as p-phenylene group, m-phenylene group, 2-methyl-1,4-phenylene group, 2,6-tetrahydronaphthylene group, and 2,6-naphthylene; and the like. One or more than one of these groups may be contained.

Among the list mentioned above, A is preferably one or more groups selected from tetramethylene group, octamethylene group, decamethylene group, o-phenylene group, p-phenylene group, m-phenylene group and 2,6-naphthylene group.

An example of a preferred embodiment of the present invention includes an embodiment comprising 10 mol % or more of a repeating unit of formula [I] wherein A is a divalent aliphatic group among all repeating units represented by formula [I], and less than 90 mol % of a repeating unit wherein A is a divalent aromatic group among all repeating units represented by formula [I].

Preferably, 90 mol % or more of A is an aliphatic group among all repeating units, in particular 90 mol % or more is preferably one or more groups selected from tetramethylene group, octamethylene group and decamethylene group, especially preferably tetramethylene group among all repeating units.

In addition, the polyesters of the present invention may contain small amounts of a structural unit represented by formula [V] below so far as the features of the present invention are not affected. In such cases, the repeating unit represented by formula [V] is preferably contained in a range of 0.1 to 5 mol % of all repeating units, for example.

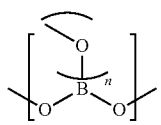

[V]

In formula [V] above, n denotes an integer of 1 or more, and B represents a group having a valency of 3 or more selected from aliphatic groups, alicyclic groups and aromatic groups.

In formula [V] above, the nature of the group B is not specifically limited, and any groups that can be used for polyesters can be used depending on required properties. Examples of polyols having a functionality of 3 or more forming part of the structure of formula [V] include glycerin, trimethylolethane, trimethylolpropane, ditrimethylolpropane, pentaerythritol and dipentaerythritol and the like.

Further, the polyesters of the present invention may contain small amounts of a repeating unit represented by formula [VI] below so far as the features of the present invention are not affected. In such cases, the repeating unit represented by formula [VI] is preferably contained in a range of 0.1 to 5 mol % of all repeating units, for example.

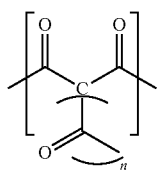

[VI]

In formula [VI] above, n denotes an integer of 1 or more, and C in formula [VI] above represents a group having a valency of 3 or more selected from aliphatic groups, alicyclic groups and aromatic groups.

In formula [VI] above, the nature of the group C is not specifically limited, and any groups that can be used for polyesters can be used depending on required properties. Examples of polycarboxylic acids having a functionality of 3 or more forming part of the structure of formula [VI] include 1,2,3-propanetricarboxylic acid, 1,2,3,4-butanetetracarboxylic acid, 1,2,4-cyclohexanetricarboxylic acid, 1,2,4,5-cyclohexanetetracarboxylic acid, trimellitic acid, pyromellitic acid and the like.

Additionally, the polyesters of the present invention may contain small amounts of a repeating unit represented by formula [VII] below so far as the features of the present invention are not affected. In such cases, the repeating unit represented by formula [VII] is preferably contained in a range of 0.1 to 20 mol % of all repeating units, for example.

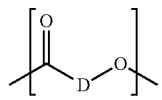

[VII]

In formula [VII], D represents a divalent group selected from aliphatic groups, alicyclic groups, and aromatic groups.

In formula [VII] above, the nature of the group D is not specifically limited, and any groups that can be used for polyesters can be used depending on required properties. Examples of D groups include aliphatic groups such as methylene group, dimethylene group, trimethylene group, tetramethylene group, pentamethylene group, hexamethylene group, 2-methyltrimethylene group, heptamethylene group, 1-methylhexamethylene group, octamethylene group, nonamethylene group, decamethylene group, dimethyloctamethylene group and undecamethylene group; alicyclic groups such as 1,3-cyclohexylene group, 1,4-cyclohexylene group, 2,6-decahydronaphthylene group, bicyclo[2.2.1]heptylene group, tricyclodecylene group and pentacyclododecylene group; aromatic groups such as p-phenylene group, m-phenylene group, 2-methyl-1,4-phenylene group, 2,6-tetrahydronaphthylene group and 2,6-naphthylene group; and the like.

The polyesters of the present invention must contain 70% or more of hydroxyl group or 70% or more of terminal carboxyl groups.

Preferably, the polyesters contain 90% or more of hydroxyl groups or 90% or more of terminal carboxyl groups, more preferably the polyesters contain 95% or more of hydroxyl groups or 95% or more of terminal carboxyl groups. Even more preferably, the polyesters contain terminal hydroxyl groups in the ranges indicated above.

The method for obtaining such polyesters containing 70% or more of terminal hydroxyl groups preferably comprises reacting a diol component and a dicarboxylic acid component in such a manner the diol component is in excess. For example, the molar ratio of the diol component:dicarboxylic acid component can be 1.2 to 3.0:1, or even 1.2 to 2.0:1. The reaction preferably takes place using a diol component in excess in this way because the initial reaction speed can be increased. In cases where the reaction takes place using a diol component in excess, a step of removing the diol component may be included at a late stage of the reaction. If one tries to obtain a polyester having a desired molecular weight by reacting a diol component and a dicarboxylic acid component in equimolar quantities as described in Example 4 of patent document 5, supra, however, the resulting polyester will typically contain 50% of terminal hydroxyl groups, well below 70%.

If one tries to obtain a polyester containing 70% or more of terminal hydroxyl groups by reacting a diol component and a dicarboxylic acid component in equimolar quantities, a step of distilling off only the dicarboxylic acid may be needed during the synthesis. However, such a step requires that the diol component and the dicarboxylic acid component should show a certain level of difference in their boiling points, and it may be difficult to obtain any polyester containing 70% or more of terminal hydroxyl groups by using equimolar quantities of a diol component and a dicarboxylic acid component as starting materials when the diol component contains a diol having a low boiling point as used in the present invention.

On the other hand, the method for obtaining polyesters containing 70% or more of terminal carboxyl groups preferably comprises reacting a diol component and a dicarboxylic acid component in such a manner the carboxylic acid component is in excess. For example, the molar ratio of the diol component dicarboxylic acid component can be 1:1.2 to 3.0, or even 1:1.2 to 2.0.

For use as starting materials of polyurethanes, the polyesters must contain terminal hydroxyl groups that react with isocyanates to form urethanes. For use as starting materials of polyester polyamides, they must contain terminal carboxyl groups that react with isocyanates to form amides.

The number average molecular weight of the polyesters of the present invention is not specifically limited, but the lower limit is preferably 400 or more, more preferably 600 or more, even more preferably 800 or more. The upper limit is 10000 or less, more preferably 5000 or less, even more preferably 3000 or less, still more preferably 2000 or less. Unless otherwise specified, the number average molecular weight as used herein refers to the value measured by the method described in the Examples later herein.

Further, the polyesters of the present invention preferably have a glass transition temperature of 30° C. or less, more preferably −20° C. or less, even more preferably −28° C. or less, still more preferably −35° C. or less, further more preferably −40° C. or less as measured by differential scanning calorimetry. When it is in such ranges, polyurethanes having excellent flexibility and mechanical properties can be obtained. The lower limit of the glass transition temperature of the polyesters of the present invention is not specifically defined, but can be −80° C. or more, for example.

When the polyesters of the present invention are used to prepare polyurethane elastomers, the resulting elastomers containing polyester moieties as soft segments have the advantage that they can be used in a wide temperature range if the polyesters used as the soft segment moieties have a low Tg. In other words, the polyester moieties would be less likely to function as soft segments if the Tg of the polyesters were higher than the temperature at which the elastomers are practically used, but the polyesters of the present invention can be used for elastomers in a wide temperature range because they have a low Tg.

Further, the polyesters of the present invention preferably have no exothermic melting peak temperature (melting point) observed (no crystallization observed) as measured by differential scanning calorimetry.

The polyesters of the present invention can be liquid at room temperature (e.g., 25° C.) so that they are preferably used for various applications. Especially for industrial uses, polyesters that are liquid at room temperature are useful.

The method for manufacturing the polyesters of the present invention is not specifically limited, and previously known methods can be applied. Typically, they can be prepared by polycondensation of starting monomers. For example, melt polymerization such as transesterification or direct esterification or solution polymerization can be applied. Previously known transesterification catalysts, esterification catalysts, etherification inhibitors, as well as polymerization catalysts, various stabilizers such as heat stabilizers and photostabilizers, polymerization modifiers and the like used for polymerization can also be used, if desired.

Examples of transesterification catalysts include compounds of manganese, cobalt, zinc, titanium, calcium and the like; and examples of esterification catalysts include compounds of manganese, cobalt, zinc, titanium, calcium and the like. Examples of polycondensation catalysts include compounds of germanium, antimony, tin, titanium and the like. Other previously known additives may also be contained. Further, not only dicarboxylic acids but also dicarboxylic acid derivatives such as dicarboxylic acid esters, dicarboxylic acid chlorides, active acyl derivatives, and dinitriles can be used as starting dicarboxylic acid components depending on the preparation method.

A process for manufacturing a polyester containing terminal hydroxyl groups comprises, for example, reacting an excess of a diol component with a dicarboxylic acid component by direct esterification or transesterification, or the like. For example, it can be prepared by reacting 1.1 to 2 molar equivalents of a diol component with a dicarboxylic acid component.

On the other hand, a process for manufacturing a polyester containing terminal carboxyl groups comprises, for example, reacting an excess of a dicarboxylic acid component with a diol component by direct esterification, or the like. For example, it can be prepared by reacting 1.1 to 2 molar equivalents of a dicarboxylic acid component with a diol component.

The polyester containing terminal hydroxyl groups of the present invention are useful as starting materials for manufacturing polyurethanes. Thus, when a polyurethane is prepared by reacting a polymer containing terminal hydroxyl groups, a polyisocyanate and optionally a chain extender, the resulting polyurethane will contain a structural unit in which each one hydrogen atom has been removed from the terminal hydroxyl groups in the main chain if a polyester of the present invention is used as at least a part of the polymer containing terminal hydroxyl groups. The polyester of the present invention here desirably accounts for 20% by weight or more, more preferably 50% by weight or more of the polymer containing terminal hydroxyl groups.

Polymers containing terminal hydroxyl groups that can be used in combination with the polyester of the present invention include those that can be used for the preparation of typical polyurethanes. For example, they include known polyesters containing terminal hydroxyl groups such as polytetramethylene adipate, polyethylene adipate, polyneopentylene adipate, polyhexamethylene adipate, polycaprolactone diol and the like; known polycarbonates such as polyalkylene carbonates containing 1,9-nonanediol or 1,6-hexanediol as an alkylene glycol component; known polyethers such as polyethylene glycol, polypropylene glycol, etc.

The method for manufacturing the polyurethanes of the present invention is not specifically limited, and previously known methods can be applied. In the present invention, a process preferably comprises reacting a polyester as described above with a polyisocyanate to give a prepolymer, and reacting the prepolymer with a chain extender. An alternative process preferably comprises mixing a polyester as described above, a polyisocyanate and a chain extender altogether, and reacting the mixture.

For example, the polyurethanes can be prepared by preheating a polyester containing terminal hydroxyl groups to about 60° C. optionally after it is homogeneously mixed with a low molecular weight compound containing two or more active hydrogen atoms (a chain extender) and the like, then adding a polyisocyanate in such an amount that the molar ratio between the numbers of active hydrogen atoms and isocyanate groups in the mixture is 0.95 to 1:1.05, feeding the mixture to a continuous twin-screw polymerizer while stirring it for a short time in a rotary mixer, and continuously reacting it. Alternatively, the polyurethanes can be prepared by reacting a polyester containing terminal hydroxyl groups with a polyisocyanate in advance to prepare a prepolymer containing terminal isocyanate groups, and then reacting the prepolymer with a chain extender.

In these preparation methods, it is also possible to use known polymerization catalysts represented by tertiary amines, organometallic salts such as organotin salts, organotitanium salts and the like.

Further, these reactions are typically performed without solvent, but may also be performed in solvents preferably including, for example, dimethylformamide, diethylformamide, dimethylacetamide, dimethyl sulfoxide, tetrahydrofuran, methyl isobutyl ketone, dioxane, cyclohexanone, benzene, toluene, ethyl cellosolve and the like.

For manufacturing the polyurethane elastomers (elastomers comprising the polyurethanes) of the present invention, compounds containing only one active hydrogen atom reactive with an isocyanate group can be used as chain terminators, e.g., monohydric alcohols such as ethyl alcohol and propyl alcohol; and secondary amines such as diethylamine and di-n-propylamine; and the like.

The polyurethanes desirably contain stabilizers such as heat stabilizers (e.g., antioxidants) or photostabilizers. Additionally, the polyurethanes may contain plasticizers, inorganic fillers, lubricants, colorants, silicone oils, foaming agents, flame retardants and the like.

Polyisocyanates include, for example, aromatic diisocyanates such as 4,4'-diphenylmethane diisocyanate, 2,4-tolylene diisocyanate, 2,6-tolylene diisocyanate, xylylene diisocyanate, and 1,5-naphthalene diisocyanate; alicyclic diisocyanates such as isophorone diisocyanate, dicyclohexylmethane diisocyanate, hydrogenated xylylene diisocyanate, and norbornene diisocyanate; aliphatic diisocyanates such as hexamethylene diisocyanate, and trimethylhexamethylene diisocyanate and the like; and these polyisocyanates may be used alone or as a combination of two or more of them. Among them, 4,4'-diphenylmethane diisocyanate is preferred. As used herein, the term "polyisocyanate" refers to a compound containing two or more isocyanate groups.

Chain extenders that can be used include low molecular weight compounds such as diols or diamines containing two or more active hydrogen atoms. Chain extenders include, for example, diols containing 2 to 10 carbon atoms such as ethylene glycol, propylene glycol, 1,4-butanediol, and 1,6-hexanediol; diamines containing 2 to 10 carbon atoms such as propylenediamine, and isophorone diamine and the like; and they may be used alone or as a combination of two or more of them. Polyurethanes are readily prepared when compounds containing two active hydrogen atoms such as diols and diamines are used as chain extenders.

The amount of the chain extenders to be used is not specifically limited, but preferably 0.1 to 20 times (molar ratio) the amount of the polyesters.

Additionally, low molecular weight monohydric alcohols such as methanol and ethanol; low molecular weight monovalent amines such as methylamine and ethylamine and the like may be used as modifiers, if desired.

The weight average molecular weight of the polyurethanes of the present invention is not specifically limited, but preferably 10,000 to 500,000. The number average molecular weight is not specifically limited, but preferably 10,000 to 100,000.

When the polymerization reaction is performed without solvent, the resulting polyurethane can be subjected to a molding process immediately after it has been polymerized. If 0.2% by weight or more of unreacted polyisocyanate exists in the polyurethane depending on polymerization conditions, it can be subjected to a molding process after it is aged at 60 to 80° C. for 4 to 30 hours as appropriate to complete the reaction.

When the polymerization reaction is performed in a solvent, the resulting polyurethane can be subjected to a molding process after it has been aggregated and precipitated by adding a poor solvent for the polyurethane, e.g., a saturated aliphatic hydrocarbon containing 6 to 10 carbon atoms such as hexane, heptane, octane, nonane or decane, or methanol, ethanol or the like, and then filtered off and dried.

The polyurethanes of the present invention comprise a repeating unit represented by formula [I]. The repeating unit represented by formula [I] is identical to the repeating unit represented by formula [I] described above, and also covers the same preferred ranges. The polyurethanes of the present invention may further comprise a repeating unit represented by formula [II] or other repeating units. In addition, diols or diamines containing two or more active hydrogen atoms can also be used as chain extenders. Especially when diamines are used as chain extenders, they can form urea bonds by a reaction with isocyanate groups to increase the molecular weight. Therefore, the polyurethanes of the present invention may contain urea bonds. Further, they can be more highly polymerized by forming a crosslinked structure via a reaction between urea bonds and isocyanate groups.

It should be noted that the polyurethanes of the present invention may comprise only one or more than one type of each of a repeating unit represented by formula [I].

An example of a preferred embodiment of a polyurethane of the present invention includes a polyurethane comprising a repeating unit represented by formula [X] below:

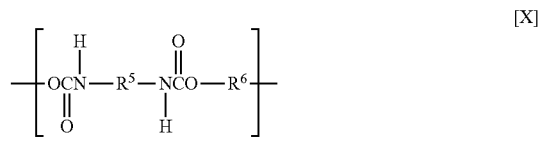

wherein $R^5$ represents a divalent hydrocarbon group, and $R^6$ contains a repeating unit represented by formula [I].

Examples of $R^5$ groups include a substituted or unsubstituted benzene ring, a substituted or unsubstituted cyclohexane ring, a substituted or unsubstituted straight-chain alkylene group containing 1 to 10 carbon atoms, and a combination thereof, wherein examples of substituents include alkyl groups, preferably methyl group or ethyl group.

Further, $R^5$ preferably represents the groups shown below, alone or as a combination thereof:

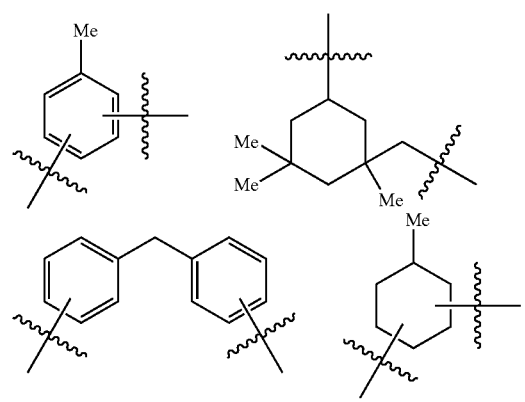

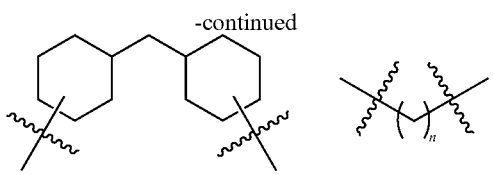

wherein Me represents methyl group, and n denotes an integer of 2 to 12.

In particular, R5 preferably represents the group shown below:

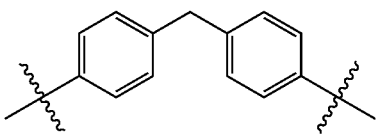 [SMILES: *c1ccc(Cc2ccc(*)cc2)cc1]

In the present embodiment, $R^6$ preferably consists substantially solely of a repeating unit represented by formula [I]. The term "substantially" means that, for example, 90% by weight or more or even 95% by weight or more of the subcomponents of R6 represent a repeating unit represented by formula [I].

In the present embodiment, the repeating unit represented by formula [X] above preferably accounts for 90% by weight or more of all repeating units contained in the polyurethane.

In addition to the repeating unit represented by formula [X], the polyurethanes of the present invention preferably also comprise a repeating unit represented by formula [XX]:

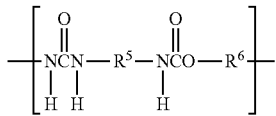

[XX]

wherein $R^5$ represents a divalent hydrocarbon group, and $R^6$ contains a repeating unit represented by formula [I].

$R^5$ has the same meaning as defined for $R^5$ in formula [X] above, and also covers the same preferred ranges.

$R^6$ has the same meaning as defined for $R^6$ in formula [X] or formula [XX], and also covers the same preferred ranges.

In the present embodiment, $R^6$ preferably consists substantially solely of a repeating unit represented by formula [I]. The term "substantially" means that, for example, 90% by weight or more or even 95% by weight or more of the subcomponents of $R^6$ represent a repeating unit represented by formula [I].

In the present embodiment, the repeating unit represented by formula [X] or formula [XX] above preferably accounts for 90% by weight or more of all repeating units contained in the polyurethane.

Such structures are obtained when the diamines described above or the like are used as chain extenders.

The polyurethanes of the present invention can be molded by various methods including, for example, extrusion molding, injection molding, calendering, blow molding and the like.

The polyesters of the present invention have excellent hydrolysis resistance so that when they are used as starting materials for manufacturing polyurethanes, polyamide elastomers, polyester elastomers and the like, the resulting products have excellent hydrolysis resistance. Further, the polyesters obtained by the present invention can also be applied for various other purposes.

The polyurethanes of the present invention retain excellent properties such as flexibility, heat resistance (especially heat aging resistance), mechanical properties and the like, and particularly have excellent hydrolysis resistance so that they can be applied for polyurethane elastomers, paints, adhesives, coatings, foams, binders, elastic fibers, synthetic leathers, artificial leathers, sealing materials, waterproofing materials, flooring materials and the like.

The polyesters of the present invention can be converted into polyester acrylates or polyester methacrylates by reacting them at the terminal hydroxyl groups with an acrylate or methacrylate respectively using previously known methods. Alternatively, they also can be converted into polyester urethane acrylates or polyester urethane methacrylates by reacting them at the terminal hydroxyl groups with a polyisocyanate, and then with a hydroxyl-containing acrylate or methacrylate, respectively. These acrylates and methacrylates can conveniently be applied for paints, adhesives, printing inks, coating materials, encapsulants and optical materials and the like.

EXAMPLES

The following Examples further illustrate the present invention without, however, limiting it thereto. The characteristics and the like of the polyesters were determined by the following methods.

(1) Hydroxyl Number, Acid Number and Number Average Molecular Weight

The hydroxyl number and acid number of each polyester were determined according to JIS K 1557, and the number average molecular weight (Mn) was calculated from the hydroxyl number and acid number by the equation below:

Mn=molecular weight of KOH×2/{[hydroxyl number (mgKOH/g)]+[acid number (mgKOH/g)]}×10$^{-3}$.

Further, the proportion of terminal hydroxyl groups was calculated by: (the measured hydroxyl number)/(the measured hydroxyl number+the measured acid number)×100(in %).

(2) Glass Transition Temperature and Melting Point

The glass transition temperature (Tg) and melting point (Tm) of each polyester were determined on about 10 mg of each sample in a non-hermetic aluminum pan using a differential scanning calorimeter from SHIMADZU CORPORATION (model: DSC/TA-60WS) at a heating rate of 10° C./min under a nitrogen gas flow (30 ml/min).

Further, the physical properties and the like of the polyurethanes were determined by the following methods.

(1) Molecular Weight

The molecular weight of each polyurethane was determined using a GPC system from Showa Denko K.K. (model: pump: Shodex DS-4; columns: Shodex GPC KD-806M×2+KD-802+KD-G) with an RI detector (model: Shodex RI-101) in N,N'-dimethylformamide as a solvent. The number average molecular weight (Mn) and weight average molecular weight (Mw) were determined using polyethylene oxide standards.

(2) Tensile Properties

Tensile tests (tensile breaking stress and tensile breaking strain) of each polyurethane were performed on 5A test specimens at 23° C., 50% RH according to JIS K 7162 using a material testing system from Instron (model: 5566).

(3) Chromaticity

The chromaticity of each polyurethane was determined on a sheet of 1 mm in thickness in transmission mode according to JIS K 7105 using a colorimeter from NIPPON DENSHOKU INDUSTRIES CO., LTD. (model: ZE-2000), and reported as yellowness in b* value (CIELAB).

(4) Hydrolysis Resistance

Test specimens of each polyurethane were immersed in ion-exchanged water at 100° C. for 200 hours, and then dried under reduced pressured at 50° C. for 24 hours, and analyzed for yellowness (chromaticity) and tensile properties (tensile breaking stress and tensile breaking strain).

(5) Heat Aging Resistance

Test specimens of each polyurethane were treated according to JIS K 7212 at 120° C. for 285 hours using a GEER type heat aging oven from Toyo Seiki Seisaku-sho, Ltd. (model: GO-01), and then analyzed for yellowness (chromaticity).

(Synthesis of Starting Diol)

Reference Example 1

Synthesis of 3,3'-oxybis(2,2-dimethylpropan-1-ol) (Formula [VIII])

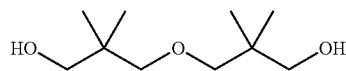

[VIII]

(1) Preparation of 2-(5,5-dimethyl-1,3-dioxan-2-yl)-2-methylpropan-1-ol (acetalization)

In a 2-liter round-bottomed flask, 131.3 g of 2,2-dimethyl-3-hydroxypropionaldehyde (hydroxypivalaldehyde from MITSUBISHI GAS CHEMICAL COMPANY, INC., purity 99.8%), 136.0 g of 2,2-dimethyl-1,3-propanediol (neopentyl glycol, reagent grade from Tokyo Chemical Industry Co., Ltd.), 705 g of benzene, and 3.0 g of Nafion beads (brand name "NR-50" from Sigma-Aldrich Corporation) were reacted at ambient pressure while the water produced was removed out of the system by azeotropic distillation with benzene using a Dean-Stark trap until no more water was collected. The reaction mixture was filtered, and then concentrated and recrystallized by cooling to give crystals of 2-(5,5-dimethyl-1,3-dioxan-2-yl)-2-methylpropan-1-ol.

(2) Preparation of a Catalyst Support

Zirconium oxide used as a support for metal components was prepared by the procedure as follows:

To 505 g of a stirred aqueous zirconium oxynitrate solution at a concentration of 25% by mass expressed as the content of zirconium oxide ($ZrO_2$) was added dropwise 15.5 g of 28% aqueous ammonia to give a white precipitate. This was filtered and washed with ion-exchanged water, and then dried at 110° C. for 10 hours to give a zirconium oxide hydrate. This was placed in a porcelain crucible and baked in air at 400° C. for 3 hours in an electric furnace, and then ground in an agate mortar to give a zirconium oxide powder (hereinafter designated as "support A"). Support A had a BET specific surface area of 102.7 m2/g (measured by nitrogen adsorption; the same method was applied in the following examples).

(3) Preparation of a Catalyst

To 50 g of support A was added an aqueous solution of 0.66% by mass of palladium chloride and 0.44% by mass of sodium chloride, whereby metal components were adsorbed onto the support. To this was poured an aqueous solution of formaldehyde and sodium hydroxide to instantly reduce the adsorbed metal components. Then, the catalyst was washed with ion-exchanged water and dried to prepare a catalyst containing 2.0% by mass of palladium supported on zirconium oxide (hereinafter designated as "catalyst A").

(4) Reduction by hydrogenation of 2-(5,5-dimethyl-1,3-dioxan-2-yl)-2-methylpropan-1-ol A 500-mL SUS reaction vessel was charged with 6.00 g of catalyst A, 24.0 g of 2-(5,5-dimethyl-1,3-dioxan-2-yl)-2-methylpropan-1-ol, and 240 g of 1,4-dioxane, and the reaction vessel was purged with nitrogen gas. Then, the reaction vessel was charged with hydrogen gas up to 8.5 MPa, and heated to the reaction temperature 230° C., and the mixture was reacted for 5 hours while the internal pressure of the reaction vessel was maintained at 13 MPa. Then, the reaction vessel was cooled and the contents of the reaction vessel were collected. The resulting reaction solution was filtered to separate the catalyst, and then recrystallized to give 3,3'-oxybis(2,2-dimethylpropan-1-ol). The structure of the resulting product was confirmed by NMR analysis.

$^1$H NMR (500 MHz, $CDCl_3$) δ 0.91 (3H×4, 2s, $Me_2C$×2), 2.50-2.68 (2H, bs, OH×2), 3.26 (4H, s, —$CH_2$—O—×2), 3.43 (4H, s, —C$\underline{H}_2$OH×2); $^{13}$C NMR (125 MHz, $CDCl_3$) δ 21.8, 36.4, 70.8, 79.7.

The necessary amount for the Examples was provided by repeating the reaction.

Reference Example 2

Synthesis of 2-ethyl-2-((3-hydroxy-2,2-dimethylpropoxy)methyl)hexan-1-ol (Formula [IX])

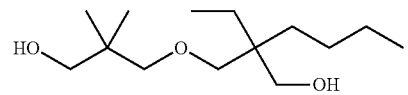

[IX]

In a 2-L round-bottomed flask, 73.6 g of 2,2-dimethyl-3-hydroxypropanal (hydroxypivalaldehyde from MITSUBISHI GAS CHEMICAL COMPANY, INC., purity 99.8%), 111.8 g of 2-butyl-2-ethyl-1,3-propanediol (reagent grade from Tokyo Chemical Industry Co., Ltd.), 705 g of benzene and 3.0 g of Nafion beads (brand name "NR-50" from Sigma-Aldrich Corporation) were reacted at ambient pressure while the water produced was removed out of the system by azeotropic distillation with benzene using a Dean-Stark trap until no more water was collected. The reaction mixture was filtered, concentrated, and then distilled under reduced pressure to give 2-(5-butyl-5-ethyl-1,3-dioxan-2-yl)-2-methylpropan-1-ol.

A 500-mL SUS reaction vessel was charged with 6.0 g of catalyst A of Reference example 1, 24.0 g of 2-(5-butyl-5-ethyl-1,3-dioxan-2-yl)-2-methylpropan-1-ol, and 240 g of 1,4-dioxane, and the reaction vessel was purged with nitrogen gas. Then, the reaction vessel was charged with hydrogen gas up to 8.5 MPa, and heated to the reaction temperature 230° C., and the mixture was reacted for 5 hours while the internal pressure of the reaction vessel was maintained at 13 MPa. Then, the reaction vessel was cooled and the contents of the reaction vessel were filtered to separate the catalyst, and then distilled under reduced pressure and purified to give the desired product. The structure of the resulting product was confirmed by NMR analysis.

$^1$H NMR (500 MHz, CDCl$_3$) δ 0.81 (3H, t, CH$_3$CH$_2$CH$_2$—), 0.90 (9H, m, Me$_2$C×2 & CH$_3$CH$_2$C), 1.10-1.38 (8H, m, CH$_3$CH$_2$CH$_2$CH$_2$— & CH$_3$CH$_2$C),2.60 (1H, bs, OH), 2.68 (1H bs, OH) 3.24, 3.30 (2H×2, 2s, —CH$_2$—O—×2), 3.41, 3.47 (2H×2, 2s, —CH$_2$OH×2); $^{13}$C NMR (125 MHz, CDCl$_3$) δ 7.3, 14.1, 21.8, 23.5, 23.6, 25.0, 30.4, 36.4, 41.0, 67.9, 70.6, 79.4, 79.5.

The necessary amount for the Examples was provided by repeating the reaction.

Synthesis of 2-ethyl-2-((3-hydroxy-2,2-dimethyl-propoxy)methyl)butan-1-ol (Formula [X])

Acetalization reaction and purification were performed by the same procedure as in Reference example 1 except that 2,2-diethyl-1,3-propanediol (reagent grade from Tokyo Chemical Industry Co., Ltd.) was used in place of 2,2-dimethyl-1,3-propanediol to give crystals of 2-(5,5-diethyl-1,3-dioxan-2-yl)-2-methylpropan-1-ol.

Reduction reaction by hydrogenation and purification were performed by the same procedure as in Reference example 2 except that 2-(5,5-diethyl-1,3-dioxan-2-yl)-2-methylpropan-1-ol was used in place of 2-(5-butyl-5-ethyl-1,3-dioxan-2-yl)-2-methylpropan-1-ol to give the desired product. The structure of the product was confirmed by NMR analysis.

$^1$H NMR (500 MHz, CDCl$_3$) δ 0.81 (3H×2, 2t, CH$_3$CH$_2$—×2), 0.90 (3H×2, 2s, Me$_2$C×2), 1.29 (2H×2, 2q, CH$_3$CH$_2$C), 2.62-2.80 (2H, bs, OH×2), 3.24, 3.30 (2H×2, 2s, —CH$_2$—O—×2), 3.41, 3.47 (2H×2, 2s, —CH$_2$OH×2); $^{13}$C NMR (125 MHz, CDCl$_3$) δ 7.22, 21.8 22.9, 36.3, 41.0, 67.4, 70.5, 76.6, 79.4.

The necessary amount for the Examples was provided by repeating the reaction.

Reference Example 4

Synthesis of 2-((3-hydroxy-2,2-dimethylpropoxy)methyl)-2-methylpentan-1-ol (Formula [XI])

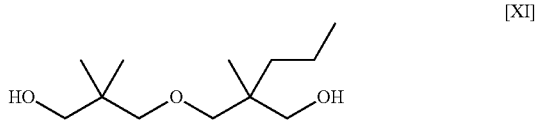

Synthesis and reduction reaction by hydrogenation of an acetal compound, and purification were performed by the same procedure as in Reference example 2 except that 2-methyl-2-propyl-1,3-propanediol (reagent grade from Tokyo Chemical Industry Co., Ltd.) was used in place of 2-butyl-2-ethyl-1,3-propanediol to give the desired product. The structure of the product was confirmed by NMR analysis.

$^1$H NMR (500 MHz, CDCl$_3$) δ 0.83 (3H, s, CH$_3$C), δ 0.91 (3H×3, 3s, Me$_2$C×2 & CH$_3$CH$_2$—), 1.20-1.38 (4H, m, CH$_3$CH$_2$CH$_2$—),2.68-2.84 (2H, bs, OH×2), 3.21-3.30 (4H, m, —CH$_2$—O—×2), 3.41-3.45 (4H, m, —CH$_2$OH×2); $^{13}$C NMR (125 MHz, CDCl$_3$) δ 15.0, 16.5, 19.0, 21.8, 36.4, 37.0, 38.9, 69.7, 70.6, 78.4, 79.5.

The necessary amount for the Examples was provided by repeating the reaction.

(Synthesis of Polyesters)

Example 1

A reaction vessel having an internal volume of 1.6 L and equipped with a paddle stirrer, a packed distillation column, a total condenser, a cold trap, a thermometer, a heater and a nitrogen gas inlet was charged with 233.8 g (1.6 mol) of adipic acid (from Rhodia), 481.0 g (2.53 mol) of 3,3'-oxybis (2,2-dimethylpropan-1-ol) (formula [IV]) obtained in Reference example 1, and 11 mg (0.03 mmol) of titanium (IV) tetrabutoxide monomer (reagent grade from Wako Pure Chemical Industries, Ltd.), and purged with nitrogen gas, after which a transesterification reaction was performed at 190° C. to 210° C. for 4 hours in a nitrogen atmosphere at ambient pressure while the temperature was gradually raised. After a predetermined amount of water was distilled off, depressurization was started and heating and depressurization were gradually proceeded for 2 hours until 240° C. and 1.2 kPa were finally reached while the diol component was removed outside of the system. Once the target molecular weight was reached as judged from the amount of the distillate, the reaction was terminated to give polyester (1). Characteristics and physical properties of the resulting polyester are shown in Table 1.

Example 2

A polyester was obtained by the same procedure as in Example 1 except that the target molecular weight was changed. Characteristics and physical properties of the resulting polyester are shown in Table 1.

Example 3

A polyester was obtained by the same procedure as in Example 1 except that sebacic acid (from Itoh Oil Chemicals Co., Ltd.) was used as a starting material of a dicarboxylic acid component structural unit. Characteristics and physical properties of the resulting polyester are shown in Table 1.

Example 4

A polyester was obtained by the same procedure as in Example 1 except that terephthalic acid (from Mizushima Aroma Co., Ltd.) and adipic acid (from Rhodia) were used in a molar ratio of 1/1 as starting materials of a dicarboxylic acid component structural unit. Characteristics and physical properties of the resulting polyester are shown in Table 1.

Example 5

A reaction vessel having an internal volume of 1.6 L and equipped with a paddle stirrer, a packed distillation column, a total condenser, a cold trap, a thermometer, a heater and a nitrogen gas inlet was charged with 293.1 g (1.1 mol) of dimethyl 2,6-naphthalenedicarboxylate (from MITSUBISHI GAS CHEMICAL COMPANY, INC.), 411.0 g (2.16 mol) of 3,3'-oxybis(2,2-dimethylpropan-1-ol) (formula [IV]) obtained in Reference example 1, and 59 mg (0.24 mmol) of manganese (II) acetate tetrahydrate (from Wako Pure Chemical Industries, Ltd.), and purged with nitrogen gas, after which a transesterification reaction was performed at 190° C. to 210° C. for 6 hours in a nitrogen atmosphere while the temperature was gradually raised. After a predetermined amount of methanol was distilled off, depressurization was started and heating and depressurization were gradually proceeded for 2 hours until 240° C. and 3.5 kPa were finally reached while the diol component was removed outside of the system. Once the target molecular weight was reached as judged from the amount of the distillate, the reaction was terminated to give a polyester. Characteristics and physical properties of the resulting polyester are shown in Table 1.

Example 8

A polyester was obtained by the same procedure as in Example 1 except that 2-((3-hydroxy-2,2-dimethylpropoxy)methyl)-2-methylpentan-1-ol (formula [VII]) obtained in Reference example 4 was used as a starting material of a diol component structural unit. Characteristics and physical properties of the resulting polyester are shown in Table 1.

Comparative Example 1

A polyester (3) was obtained by the same procedure as in Example 1 except that diethylene glycol (from Wako Pure Chemical Industries, Ltd.) was used as a starting material of a diol component structural unit. Characteristics and physical properties of the resulting polyester are shown in Table 1.

TABLE 1

| | Diol component | Dicarboxylic acid component | Tg (° C.) | Tm* (° C.) | Hydroxyl number (mgKOH/g) | Acid number (mgKOH/g) | Mn |
|---|---|---|---|---|---|---|---|
| Example 1 | 3,3'-oxybis(2,2-dimethylpropan-1-ol) | Adipic acid | −52 | — | 88 | 0.7 | 1290 |
| Example 2 | 3,3'-oxybis(2,2-dimethylpropan-1-ol) | Adipic acid | −48 | — | 58 | 0.1 | 1930 |
| Example 3 | 3,3'-oxybis(2,2-dimethylpropan-1-ol) | Sebacic acid | −61 | — | 65 | 0.1 | 1720 |
| Example 4 | 3,3'-oxybis(2,2-dimethylpropan-1-ol) | Terephthalic acid/Adipic acid(1/1) | −31 | — | 78 | 0.1 | 1430 |
| Example 5 | 3,3'-oxybis(2,2-dimethylpropan-1-ol) | 2,6-naphthalene dicarboxylic acid | 27 | — | 82 | 0.1 | 1360 |
| Example 6 | 2-ethyl-2-((3-hydroxy-2,2-dimethylpropoxy)methyl)hexan-1-ol | Adipic acid | −43 | — | 125 | 0.7 | 890 |
| Example 7 | 2-ethyl-2-((3-hydroxy-2,2-dimethylpropoxy)methyl)butan-1-ol | Adipic acid | −48 | — | 113 | 0.9 | 980 |
| Example 8 | 2-((3-hydroxy-2,2-dimethylpropoxy)methyl)-2-methylpentan-1-ol | Adipic acid | −49 | — | 70 | 0.2 | 1590 |
| Comparative example 1 | Diethylene glycol | Adipic acid | −59 | — | 96 | 0.1 | 1200 |

*—: No crystallization observed.

Example 6

A polyester (2) was obtained by the same procedure as in Example 1 except that 2-ethyl-2-((3-hydroxy-2,2-dimethylpropoxy)methyl)hexan-1-ol (formula [V]) obtained in Reference example 2 was used as a starting material of a diol component structural unit. Characteristics and physical properties of the resulting polyester are shown in Table 1.

Example 7

A polyester was obtained by the same procedure as in Example 1 except that 2-ethyl-2-((3-hydroxy-2,2-dimethylpropoxy)methyl)butan-1-ol (formula [VI]) obtained in Reference example 3 was used as a starting material of a diol component structural unit. Characteristics and physical properties of the resulting polyester are shown in Table 1.

As shown above, the proportion of terminal hydroxyl groups calculated by (the measured hydroxyl number)/(the measured hydroxyl number+the measured acid number)×100 was found to be 99.2% or more.

(Synthesis of Polyurethanes)

Example 9

A 500 ml-flask equipped with a paddle stirrer and a nitrogen gas inlet was charged with 142.4 g of polyester (1) obtained in Example 1, and water was removed under reduced pressure at 80° C. for 2 hours, and then 57.6 g of methylenediphenyl 4,4'-diisocyanate (also known as 4,4'-diphenylmethane diisocyanate) was added and the mixture was reacted for 2 hours to prepare a prepolymer. Then, 10.1 g of 1,4-butanediol was added as a chain extender, and removed after a few minutes when the viscosity increased. About 200 g of the resulting product was placed in a mixer from Brabender GmbH & Co., KG (brand name: Plasti- Corder® Lab-Station), and kneaded at 160° C., 30 rpm for 10 minutes. The resulting polyurethane was compression-molded into a sheet using a hydraulic molding machine from Toho Press Manufacturing, Ltd., and then cut to prepare test specimens. The evaluation results of the resulting test specimens are shown in Table 2.

Example 10

A polyurethane was prepared by the same procedure as in Example 9 except that the polyester (2) obtained in Example 6 was used in place of the polyester (1). The evaluation results of the resulting polyurethane are shown in Table 2.

Comparative Example 2

A polyurethanes was prepared by the same procedure as in Example 9 except that the polyester (3) obtained in Comparative example 1 was used in place of the polyester (1). The evaluation results of the resulting polyurethane are shown in Table 2.

TABLE 2

|  | | | Initial properties | | | Hydrolysis resistance test (200 h) | | | Heat aging |
| --- | --- | --- | --- | --- | --- | --- | --- | --- | --- |
|  | Mn | Mw | Chromaticity b* | Tensile breaking stress (mPa) | Tensile breaking strain (%) | Chromaticity b* | Retention rate of tensile breaking stress (%) | Retention rate of tensile breaking strain (%) | resistance test (285 h) Chromaticity b* |
| Example 9 | 58000 | 120000 | 5 | 47 | 560 | 12 | 16 | 114 | 65 |
| Example 10 | 44000 | 86000 | 11 | 46 | 520 | 12 | 26 | 116 | 30 |
| Comparative example 2 | 73000 | 230000 | 6 | 59 | 550 | 27 | 4 | 10 | 80 |

The polyurethanes obtained from the polyesters of the present invention showed high retention rates of tensile breaking stress and tensile breaking strain in the hydrolysis resistance test, as well as less discoloration in the heat aging resistance test, proving that they are superior to Comparative example in hydrolysis resistance and heat aging resistance.

Particularly, a comparison between Example 9 and Example 10 showed that higher hydrolysis resistance and heat aging resistance can be achieved by using a repeating unit represented by formula [I] wherein the combination of $R^1$ and $R^2$ and the combination of $R^3$ and $R^4$ are different from each other.

INDUSTRIAL APPLICABILITY

When the polyesters of the present invention are used as starting materials for manufacturing polyurethanes, polyamide elastomers, polyester elastomers and the like, the resulting products have excellent hydrolysis resistance, heat resistance (especially heat aging resistance) and the like. They also can be used as component materials of paints, adhesives, pressure-sensitive adhesives, inks, covering materials, encapsulants and the like; as well as polymer modifiers, polymer plasticizers and the like. Further, the polyurethanes of the present invention retain excellent properties such as flexibility, heat resistance (especially heat aging resistance), mechanical properties and the like, and particularly have excellent hydrolysis resistance so that they can be applied for polyurethane elastomers, paints, adhesives, coatings, foams, binders, elastic fibers, synthetic leathers, artificial leathers, sealing materials, waterproofing materials, flooring materials and the like.

What is claimed is:

1. A polyester, comprising:
a plurality of polyester molecules comprising a plurality of repeating units including at least one type of repeating unit of formula [I] such that 99.2% or more of terminal groups in the polyester molecules is a hydroxyl group,
wherein the plurality of polyester molecules has a glass transition temperature of −20° C. or less as measured by differential scanning calorimetry, and the formula [I] is

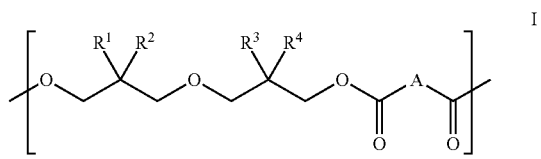

where $R^1$, $R^2$, $R^3$ and $R^4$ each independently represent an aliphatic hydrocarbon group comprising 1 to 6 carbon atoms, and A represents a divalent group selected from the group consisting of an aliphatic group, an alicyclic group, and an aromatic group, and the plurality of polyester molecules has a number average molecular weight of 2000 or less, and an acid number of 0.1 mgKOH/g or more.

2. The polyester according to claim 1, wherein the repeating unit of the formula [I] is contained at a ratio of 20 mol % or more in the repeating units.

3. The polyester according to claim 1, wherein, in the repeating unit of the formula [I], a combination of $R^1$ and $R^2$ and a combination of $R^3$ and $R^4$ are different from each other.

4. The polyester according to claim 1, wherein the plurality of polyester molecules has the number average molecular weight in a range of 400 to 2000.

5. The polyester according to claim 1, wherein the plurality of polyester molecules has a glass transition temperature of −28° C. or less as measured by differential scanning calorimetry.

6. The polyester according to claim 1, wherein the repeating unit of the formula [I] is contained at a ratio of 50 mol % or more in the repeating units.

7. The polyester according to claim 1, wherein the repeating unit of the formula [I] comprises a repeating unit of the formula [1] in which A is a divalent aliphatic group and which is 10 mol % or more of the repeating unit of the formula [I], and a repeating unit of the formula [I] in which A is a divalent aromatic group and which is less than 90 mol % of the repeating unit of the formula [1].

8. The polyester according to claim 1, wherein the repeating unit of the formula [I] in which A is a divalent aliphatic group and which is 90 mol % or more of the repeating unit of the formula [I].

9. The polyester according to claim 8, wherein A in formula [I] is each independently selected from the group consisting of a tetramethylene group, an octamethylene group and a decamethylene group.

10. The polyester according to claim 1, wherein 90 mol % 99.2% or more of the terminal groups in the polyester molecules is the hydroxyl group.

11. The polyester according to claim 1, wherein $R^1$ and $R^2$ represent a methyl group in the formula [I].

12. The polyester according to claim 11, wherein $R^3$ and $R^4$ represent a methyl group in the formula [I].

13. The polyester according to claim 11, wherein at least one of $R^3$ and $R^4$ represents a group other than a methyl group in the formula [I].

14. A polyurethane obtained by reacting the polyester of claim 1 as a starting material with a polyisocyanate.

15. An elastomer comprising the polyurethane of claim 14.

16. A process for manufacturing a polyester, comprising:
reacting a diol component comprising at least one type of diol of the formula [III] with a dicarboxylic acid in a molar ratio of 1.2 to 3.0:1 such that a polyester is obtained, wherein the formula [III],

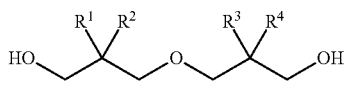

where $R^1$, $R^2$, $R^3$ and $R^4$ each independently represent an aliphatic hydrocarbon group comprising 1 to 6 carbon atoms, the polyester comprises a plurality of polyester molecules comprising a plurality of repeating units including at least one type of repeating unit of formula [I] such that 99.2% or more of terminal groups in the polyester molecules is a hydroxyl group, the formula [I] is

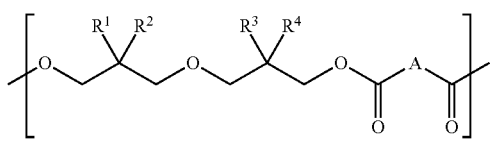

where $R^1$, $R^2$, $R^3$ and $R^4$ each independently represent an aliphatic hydrocarbon group comprising 1 to 6 carbon atoms, and A represents a divalent group selected from the group consisting of an aliphatic group, an alicyclic group, and an aromatic group, and the plurality of polyester molecules has a number average molecular weight of 2000 or less, a glass transition temperature of −20° C. or less as measured by differential scanning calorimetry, and an acid number of 0.1 mgKOH/g or more.

17. A process for manufacturing a polyurethane, comprising:
reacting the polyester of claim 1 with a polyisocyanate.

18. The process for manufacturing a polyurethane according to claim 17, wherein the reacting comprises reacting the polyester with the polyisocyanate to obtain a prepolymer, and reacting the prepolymer with a chain extender.

19. A polyurethane, comprising:
polyester moieties comprising a plurality of repeating units including at least one type of repeating unit of formula [I],
wherein the formula m is

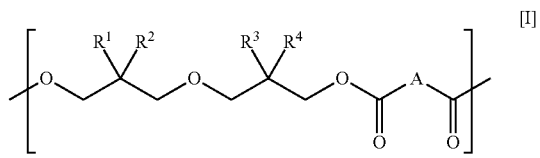

where $R^1$, $R^2$, $R^3$ and $R^4$ each independently represent an aliphatic hydrocarbon group comprising 1 to 6 carbon atoms, and A represents a divalent group selected from the group consisting of an aliphatic group, an alicyclic group, and an aromatic group, the polyester moieties are obtained from a plurality of polyester molecules such that 99.2% or more of terminal groups in the polyester molecules is a hydroxyl group, and that the plurality of polyester molecules has a number average molecular weight of 2000 or less, and the plurality of polyester molecules has a glass transition temperature of −20° C. or less as measured by differential scanning calorimetry, and an acid number of 0.1 mgKOH/g or more.

20. The polyester according to claim 1, wherein the plurality of polyester molecules has a glass transition temperature of −35° C. or less as measured by differential scanning calorimetry.

21. The polyester according to claim 1, wherein the repeating unit of the formula [I] is such that 60 mol % or more of A in the formula [I] is an aliphatic group.

22. The polyester according to claim 1, wherein the plurality of polyester molecules is derived from a diol component and a dicarboxylic acid component.

23. The polyester according to claim 1, wherein the plurality of polyester molecules is a polyester diol.

* * * * *